US012764785B2

(12) United States Patent
Chen et al.

(10) Patent No.: US 12,764,785 B2
(45) Date of Patent: Oct. 13, 2026

(54) ADAPTIVE TXOP SHARING FOR LATENCY-SENSITIVE TRAFFIC IN WIRELESS COMMUNICATIONS

(71) Applicant: MediaTek Inc., Hsinchu City (TW)

(72) Inventors: Kuo-Wei Chen, Hsinchu City (TW); Ying-You Lin, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 443 days.

(21) Appl. No.: 18/367,802

(22) Filed: Sep. 13, 2023

(65) Prior Publication Data

US 2024/0155675 A1 May 9, 2024

Related U.S. Application Data

(60) Provisional application No. 63/382,732, filed on Nov. 8, 2022.

(51) Int. Cl.
*H04W 74/0808* (2024.01)

(52) U.S. Cl.
CPC ................................ *H04W 74/0808* (2013.01)

(58) Field of Classification Search
CPC .......................... H04W 74/0808; H04W 84/12
See application file for complete search history.

(56) References Cited

U.S. PATENT DOCUMENTS

2018/0220325 A1 8/2018 Lee et al.
2021/0127307 A1* 4/2021 Huang .................. H04W 16/18
2021/0127420 A1* 4/2021 Lu ..................... H04W 74/0808
2021/0315025 A1* 10/2021 Seok ................. H04W 74/0808
2022/0053560 A1 2/2022 Xin et al.
2023/0389014 A1* 11/2023 Nayak ............... H04W 72/1268
2024/0063995 A1* 2/2024 Ajami ................... H04W 72/25
2024/0114552 A1* 4/2024 Kim .................. H04W 74/0816

FOREIGN PATENT DOCUMENTS

WO WO 2018036629 A1 3/2018
WO WO 2022208211 A2 10/2022

OTHER PUBLICATIONS

European Patent Office, Extended European Search Report in European Patent Application No. 23207976.4-1215, Mar. 14, 2024.

* cited by examiner

*Primary Examiner* — Ricky Q Ngo
*Assistant Examiner* — Kabir U Jahangir
(74) *Attorney, Agent, or Firm* — Andy M. Han; Han IP PLLC

(57) ABSTRACT

Techniques pertaining to adaptive transmission opportunity (TXOP) sharing for latency-sensitive traffic in wireless communications are described. An apparatus determines whether to activate an adaptive TXOP sharing mechanism with respect to a plurality of traffics having different latency requirements and pending transmission. In response to a positive determination, the apparatus utilizes the adaptive TXOP sharing mechanism in transmitting one or more traffics of the plurality of traffics associated with a plurality of stations (STAs) by performing either or both of: (i) selecting a candidate traffic from the one or more traffics of the plurality of traffics; and (ii) adjusting a transmission time of the candidate traffic in transmitting the candidate traffic during a TXOP.

18 Claims, 10 Drawing Sheets

ADAPTIVE TXOP SHARING FOR LATENCY-SENSITIVE TRAFFIC IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/382,732, filed 8 Nov. 2022, the content of which herein being incorporated by reference in its entirety.

TECHNICAL FIELD

The present disclosure is generally related to wireless communications and, more particularly, to adaptive transmission opportunity (TXOP) sharing for latency-sensitive traffic in wireless communications.

BACKGROUND

Unless otherwise indicated herein, approaches described in this section are not prior art to the claims listed below and are not admitted as prior art by inclusion in this section.

In wireless communications in accordance with one or more Institute of Electrical and Electronics Engineers (IEEE) standards, such as IEEE 802.11ac, TXOP sharing rule has been defined for both multi-user (MU) and single-user (SU) frame exchange sequences. However, in an event that the transmission time for a PPDU for a non-latency-sensitive traffic is relatively long, the delay requirement of a latency-sensitive traffic awaiting transmission could be violated. Therefore, there is a need for a solution of adaptive TXOP sharing for latency-sensitive traffic in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to adaptive TXOP sharing for latency-sensitive traffic in wireless communications. Thus, it is believed that various schemes proposed herein may address or otherwise alleviate the aforementioned issue(s), such as reduction in performance overhead.

In one aspect, a method may involve determining whether to activate an adaptive TXOP sharing mechanism with respect to a plurality of traffics having different latency requirements and pending transmission. In response to determining to activate the adaptive TXOP sharing mechanism, the method may also involve utilizing the adaptive TXOP sharing mechanism in transmitting one or more traffics of the plurality of traffics associated with a plurality of STAs by performing either or both of: (i) selecting a candidate traffic from the one or more traffics of the plurality of traffics; and (ii) adjusting a transmission time of the candidate traffic in transmitting the candidate traffic during a TXOP.

In another aspect, an apparatus (e.g., implemented in a multi-link device (MLD)) may include a transceiver configured to communicate wirelessly and a processor coupled to the transceiver. The processor may determine whether to activate an adaptive TXOP sharing mechanism with respect to a plurality of traffics having different latency requirements and pending transmission. In response to determining to activate the adaptive TXOP sharing mechanism, the processor may utilize the adaptive TXOP sharing mechanism in transmitting one or more traffics of the plurality of traffics associated with a plurality of STAs by performing either or both of: (i) selecting a candidate traffic from the one or more traffics of the plurality of traffics; and (ii) adjusting a transmission time of the candidate traffic in transmitting the candidate traffic during a TXOP.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, Zig Bee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to adaptive TXOP sharing for latency-sensitive traffic in wireless communications. According to the present disclosure, a number of possible solutions may be implemented separately or jointly. That is, although these possible solutions may be described below separately, two or more of these possible solutions may be implemented in one combination or another.

Figure 1:
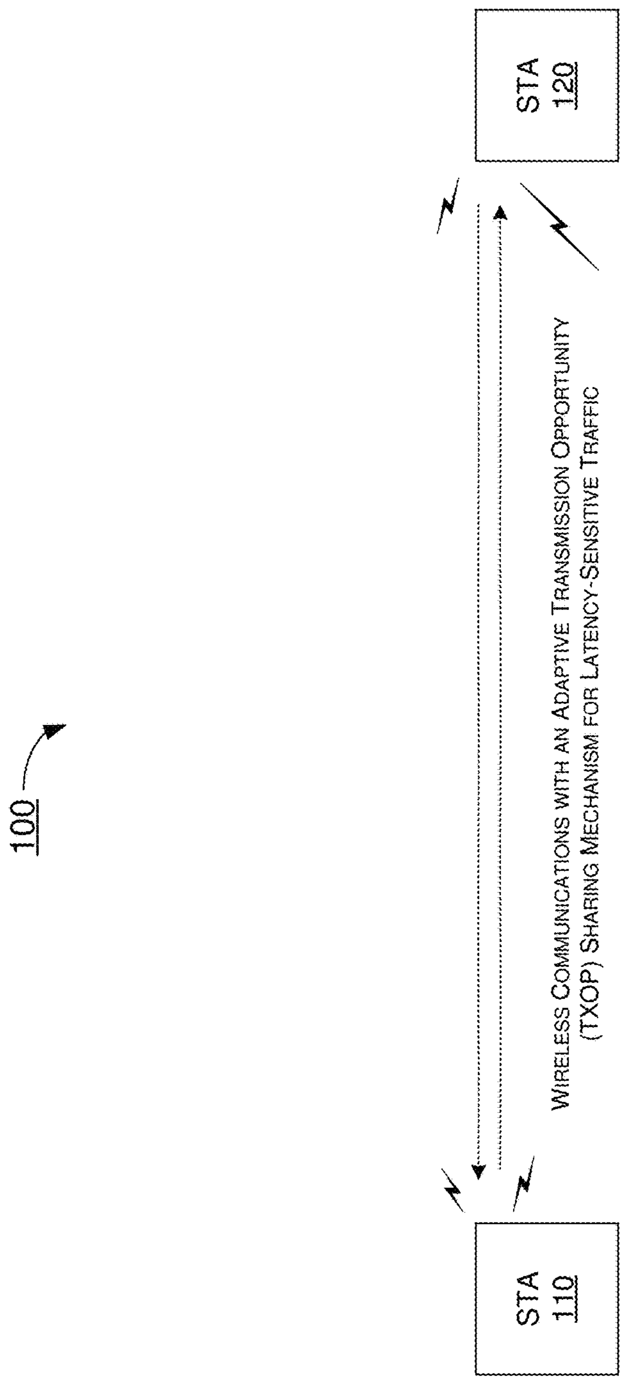
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 10 illustrate examples of implementation of various proposed schemes in network environment 100 in accordance with the present disclosure. The following description of various proposed schemes is provided with reference to FIG. 1~FIG. 10.

Referring to FIG. 1, network environment 100 may involve at least a STA 110 communicating wirelessly with a STA 120. Each of STA 110 and STA 120 may be a non-access point (non-AP) STA or, alternatively, either of STA 110 and STA 120 may function as an access point (AP) STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the techniques pertaining to adaptive TXOP sharing for latency-sensitive traffic in wireless communications in accordance with various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

According to the IEEE 802.11be specification, a quality of service (QoS) characteristics element includes, among other fields, a Delay Bound field. The Delay Bound field contains an unsigned integer that specifies the maximum amount of time (in microseconds) allowed to transport a medium access control (MAS) service data unit (MSDU) or aggregated MSDU (A-MSDU) belonging to a traffic flow, measured between the time marking the arrival of the MSDU or the first MSDU of the A-MSDU, at a local MAC sublayer from a local MAC service access point (SAP) and the time of completion of the successful transmission or retransmission of the MSDU or A-MSDU to its destination. The completion time of the MSDU or A-MSDU transmission/retransmission includes the corresponding acknowledgement frame transmission time, if present.

Figure 2:
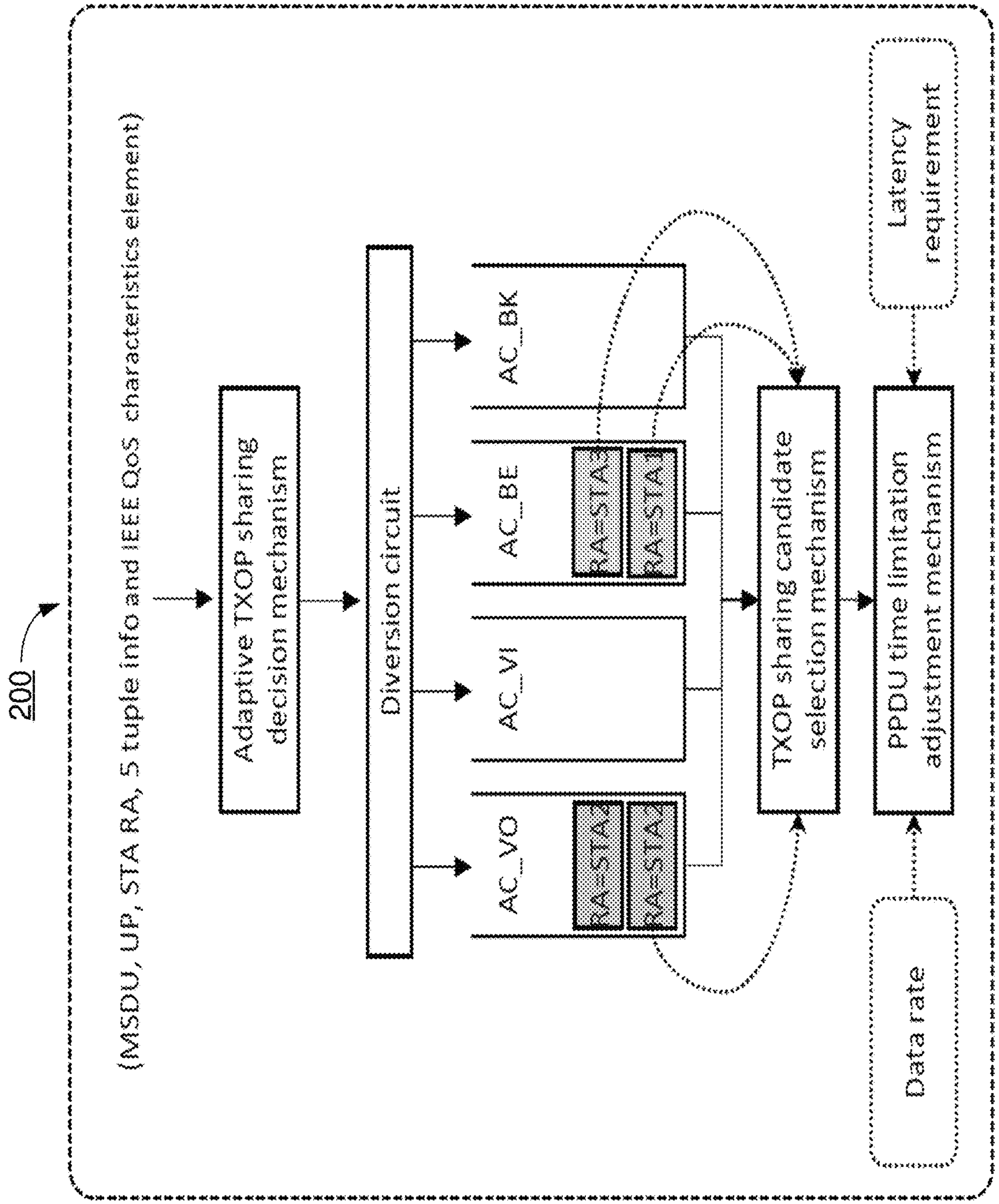
FIG. 2 is a diagram of an example scenario in which various proposed solutions and schemes in accordance with the present disclosure may be implemented.

FIG. 2 illustrates an example scenario 200 in which various proposed schemes in accordance with the present disclosure may be implemented. Under the proposed schemes, an adaptive TXOP sharing decision mechanism may be utilized (e.g., by each of STA 110 and STA 120). In particular, the adaptive TXOP sharing decision mechanism may distinguish whether adaptive TXOP sharing may be turned off (deactivated) or turned on (activated) based on the characteristics of certain traffic (e.g., a latency-sensitive traffic in concern). For instance, the decision may be based on a receiver address (RA), five-tuple information (e.g., source Internet Protocol (IP) address, destination IP address, source port, destination port and protocol) and IEEE QoS characteristics element. Under the proposed schemes, an adaptive TXOP sharing mechanism may include two parts, namely: a TXOP sharing candidate selection mechanism and a physical-layer protocol data unit (PPDU) time limitation and adjustment mechanism.

Under the proposed schemes, the TXOP sharing candidate selection mechanism may dynamically decide or otherwise select a TXOP sharing candidate from different STAs with traffics associated with different latency requirements. The traffics to/from these STAs may be of the same access category (AC) or different ACs. Available ACs may include, for example and listed in a descending order in terms of priority, voice (VO), video (VI), best effort (BE) and background (BK). Moreover, the TXOP sharing candidate selection mechanism may send traffic of a higher-priority AC in the TXOP of a lower-priority AC first even when/if a queue of PPDUs of the lower-priority AC (e.g., a primary AC) pending for transmission is not empty. Under the proposed schemes, the PPDU time limitation and adjustment mechanism may limit or otherwise adjust the PPDU time or period allocated for transmission of PPDU(s) of a non-latency-sensitive traffic in a TXOP based on the latency requirement of a different latency-sensitive traffic (e.g., a higher-priority and latency-sensitive traffic associated with another STA) and its data rate.

Figure 3:
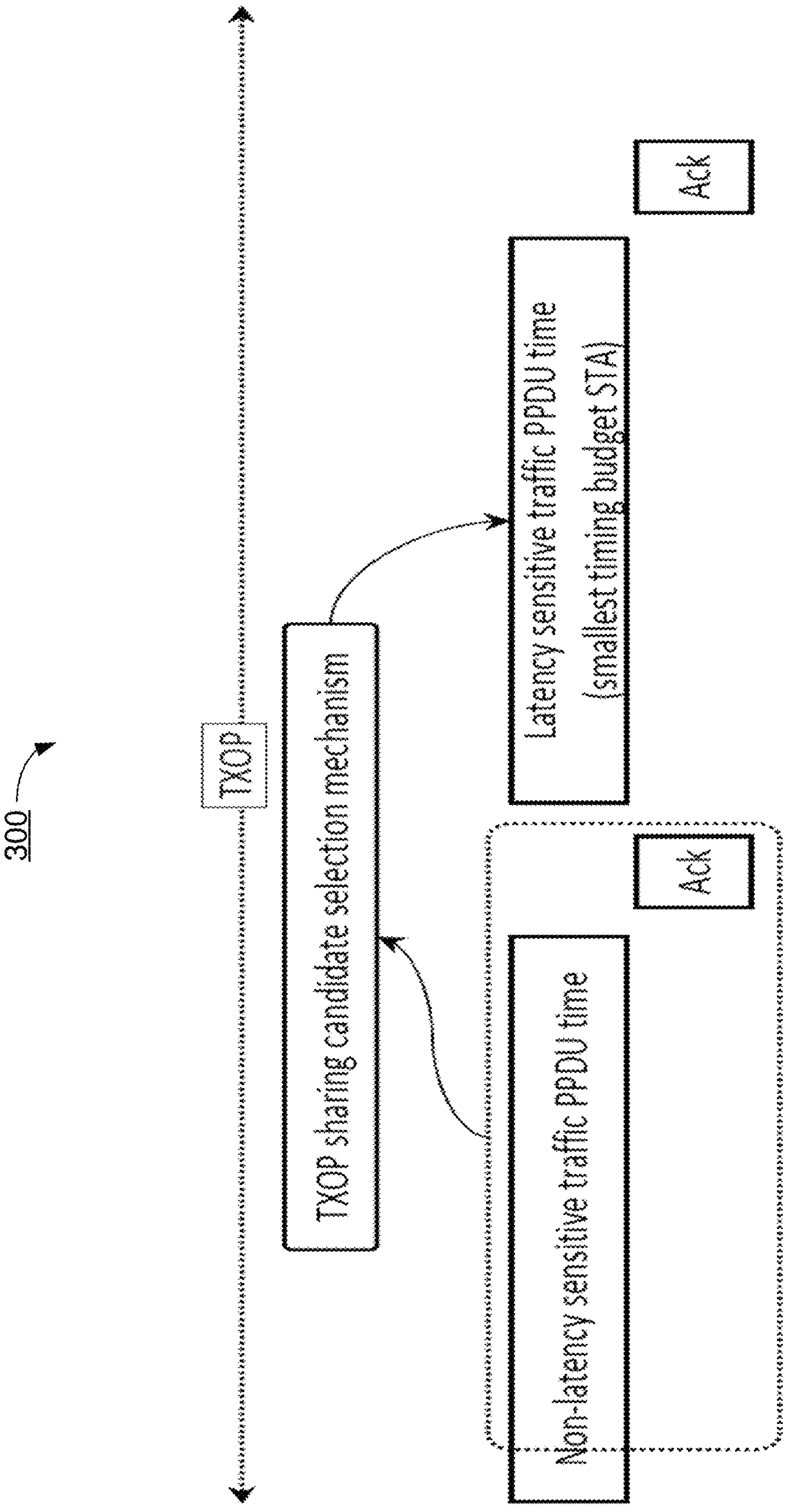
FIG. 3 is a diagram of an example scenario under a proposed scheme in accordance with the present disclosure.

FIG. 3 illustrates an example scenario 300 under a proposed scheme in accordance with the present disclosure. Scenario 300 may pertain to the TXOP sharing candidate selection mechanism. Referring to FIG. 3, based on the TXOP sharing candidate selection mechanism under the proposed scheme, a STA (e.g., STA 110 or STA 120) may dynamically decide or otherwise select a TXOP sharing candidate from different STAs with traffics associated with different latency requirements (and the traffics of the different STAs may be of the same AC). It is noteworthy that traffics of the same AC from different devices/STAs may have different latency requirements and enqueued times. Under the proposed scheme, the STA may calculate priority based on the remaining time budget of each STA (not following a first-in-first-out or last-in-first-out basis) on the PPDU period of a non-latency-sensitive traffic. Moreover, the STA with the smallest time budget (compared to that of other STAs) may transmit after a packet of the non-latency-sensitive traffic has been transmitted. Furthermore, a latency-sensitive traffic with a higher-priority AC may be transmitted first in a TXOP of a lower-priority AC even though the lower-priority AC (primary AC for that TXOP) is not empty.

Figure 4:
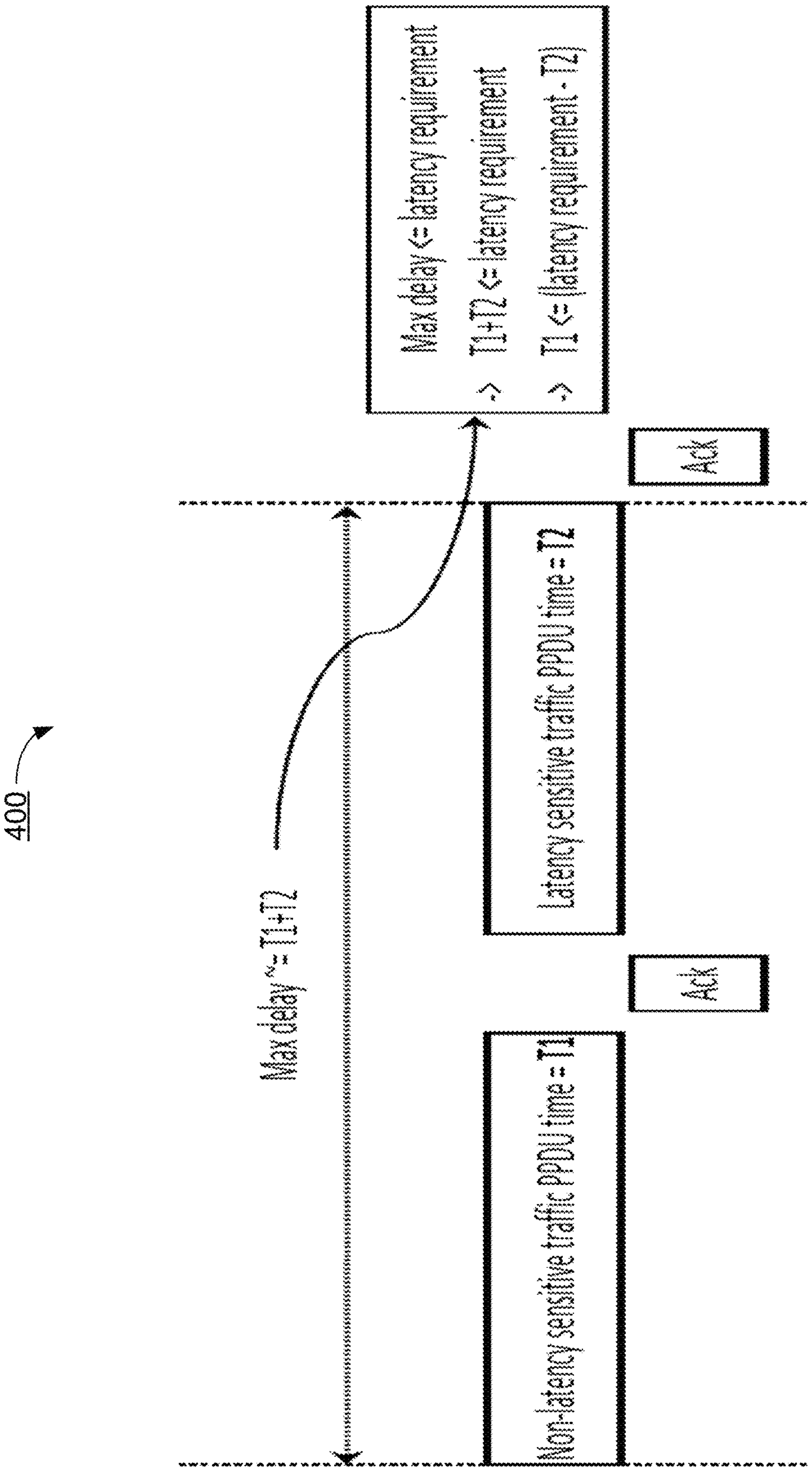
FIG. 4 is a diagram of an example scenario under a proposed scheme in accordance with the present disclosure.

FIG. 4 illustrates an example scenario 400 under a proposed scheme in accordance with the present disclosure. Scenario 400 may pertain to the PPDU time limitation and adjustment mechanism. Referring to FIG. 4, a STA (e.g., STA 110 or STA 120) may limit or adjust the PPDU time of a non-latency-sensitive traffic in a TXOP by the latency requirement and data rate of different latency-sensitive STA(s). Firstly, because of the unpredictability of the arrival time of a latency-sensitive traffic, a maximum delay for the latency-sensitive traffic may be approximated to be the PPDU time of a non-latency-sensitive traffic (e.g., T1) plus the PPDU time of the latency-sensitive traffic (e.g., T2). Additionally, in order to reach a bounded latency, the maximum delay (e.g., T1+T2) may be limited to less than or equal to a latency requirement (e.g., T1+T2≤latency requirement). Moreover, the PPDU time of the non-latency-sensitive traffic may be limited to be less than or equal to the latency requirement minus the PPDU time of the latency-sensitive traffic (e.g., T1≤(latency requirement−T2)).

Figure 5:
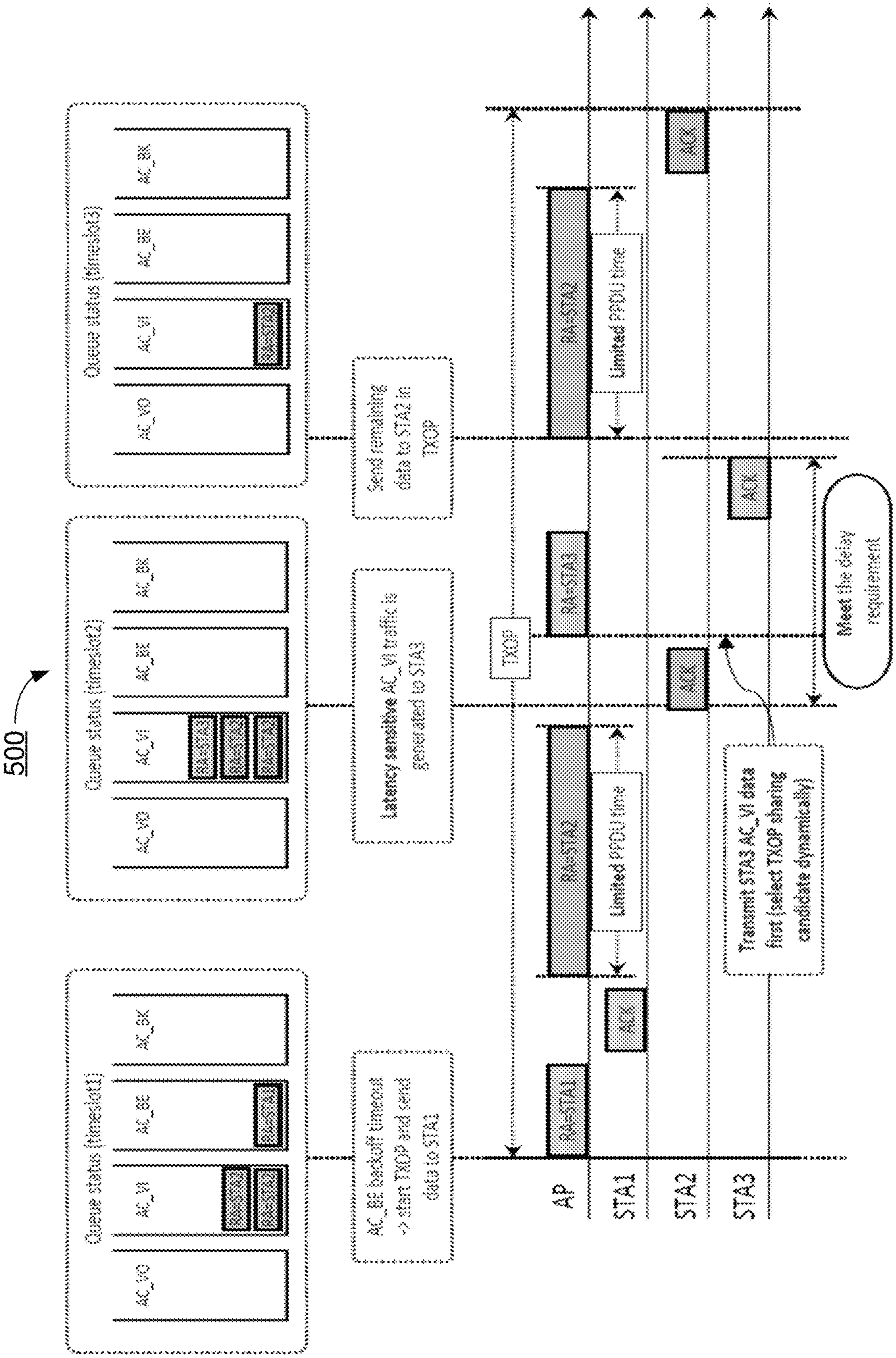
FIG. 5 is a diagram of an example scenario under a proposed scheme in accordance with the present disclosure.

FIG. 5 illustrates an example scenario 500 under a proposed scheme in accordance with the present disclosure. Specifically, scenario 500 pertains to dynamic TXOP candidate selection with respect to downlink (DL) transmission and the same AC. Referring to FIG. 5, there is no latency-sensitive traffic in timeslot 1. Upon expiry of a backoff timer associated with AC_BE, an AP starts a TXOP and transmits AC_BE data to STA1. After completion of the transmission to STA1, the AP transmits AC_VI data to STA2 with a limited PPDU time. In timeslot 2, latency-sensitive AC_VI data is generated and destined for STA3, and thus the AP transmits the AC_VI data on the next PPDU to meet the delay requirement associated with the AC_VI data. In timeslot 3, the AP transmits remaining AC_VI data in the queue to STA2.

Figure 6:
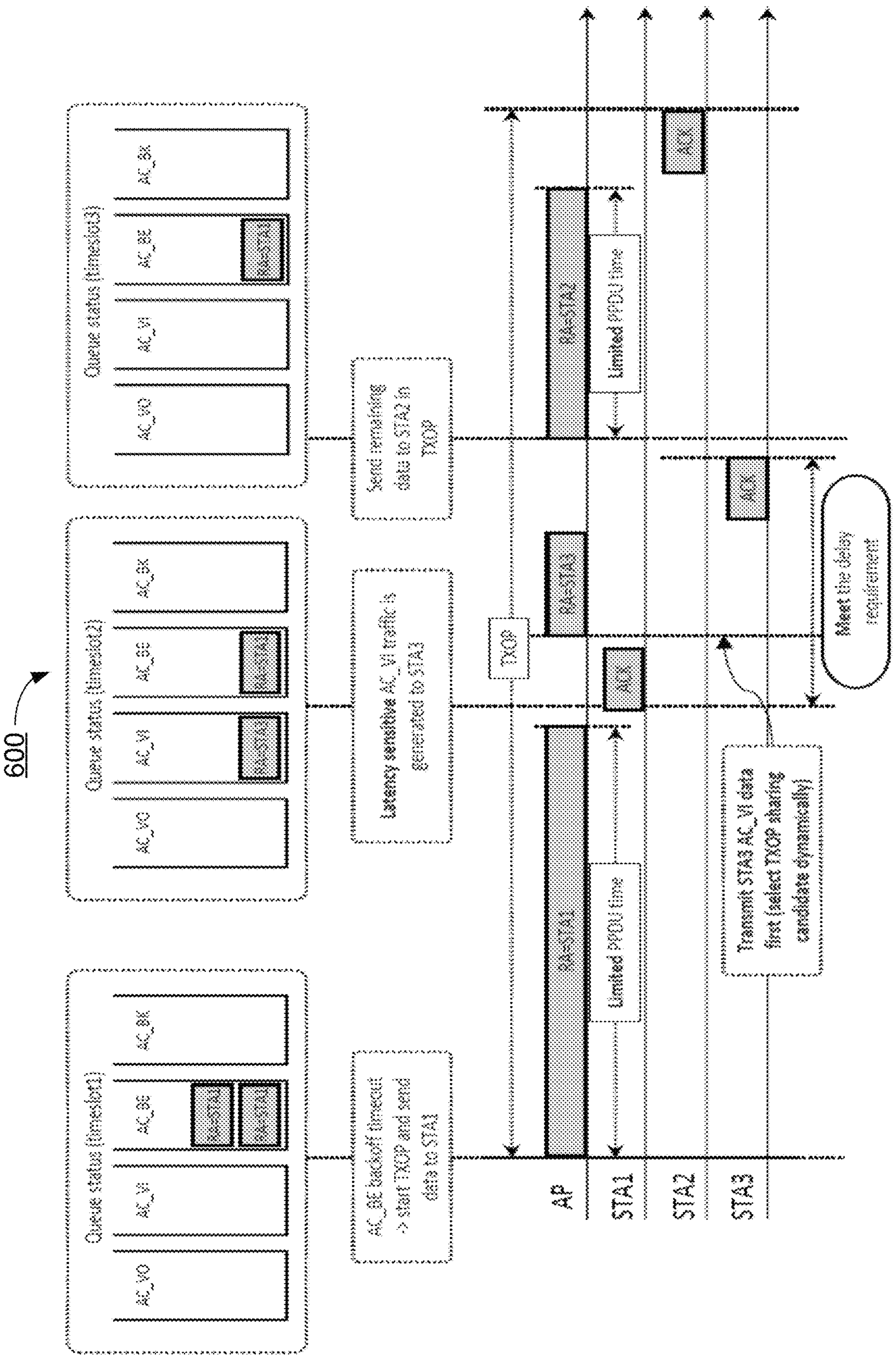
FIG. 6 is a diagram of an example scenario under a proposed scheme in accordance with the present disclosure.

FIG. 6 illustrates an example scenario 600 under a proposed scheme in accordance with the present disclosure. Specifically, scenario 600 pertains to dynamic TXOP candidate selection with respect to DL transmission and different ACs. Referring to FIG. 6, there is only a queue of AC_BE data for STA1 and STA2 for transmission in timeslot 1. Upon expiry of a backoff timer associated with AC_BE, an AP starts a TXOP and transmits AC_BE data to STA1 with a limited PPDU time. In timeslot 2, latency-sensitive AC_VI data is generated and destined for STA3, and thus the AP transmits the AC_VI data on the next PPDU to meet the delay requirement associated with the AC_VI data, even though the queue of the AC_BE data is not empty (e.g., the queue associated with the primary AC is not empty). In timeslot 3, the AP transmits AC_BE data to STA2.

Figure 7:
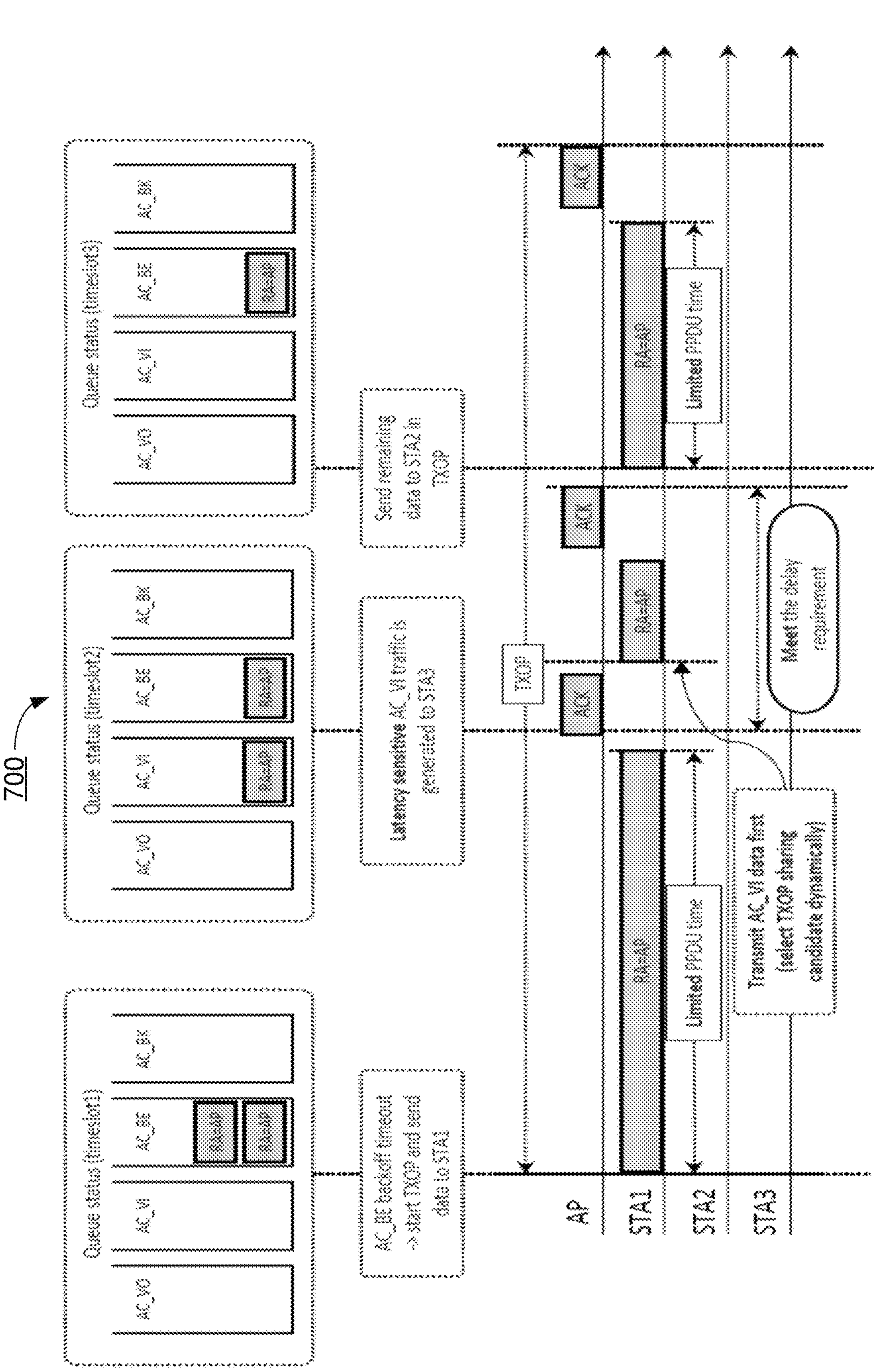
FIG. 7 is a diagram of an example scenario under a proposed scheme in accordance with the present disclosure.

FIG. 7 illustrates an example scenario 700 under a proposed scheme in accordance with the present disclosure. Specifically, scenario 700 pertains to dynamic TXOP candidate selection with respect to uplink (UL) transmission and different ACs. Referring to FIG. 7, there is only a queue of AC_BE data for AP for transmission in timeslot 1. Upon expiry of a backoff timer associated with AC_BE, STA1 starts a TXOP and transmits AC_BE data to an AP with a limited PPDU time. In timeslot 2, latency-sensitive AC_VI data is generated and destined for the AP, and thus STA1 transmits the AC_VI data on the next PPDU to meet the delay requirement associated with the AC_VI data, even though the queue of the AC_BE data is not empty (e.g., the queue associated with the primary AC is not empty). In timeslot 3, STA1 transmits remaining AC_BE data in the queue to the AP.

Figure 8:
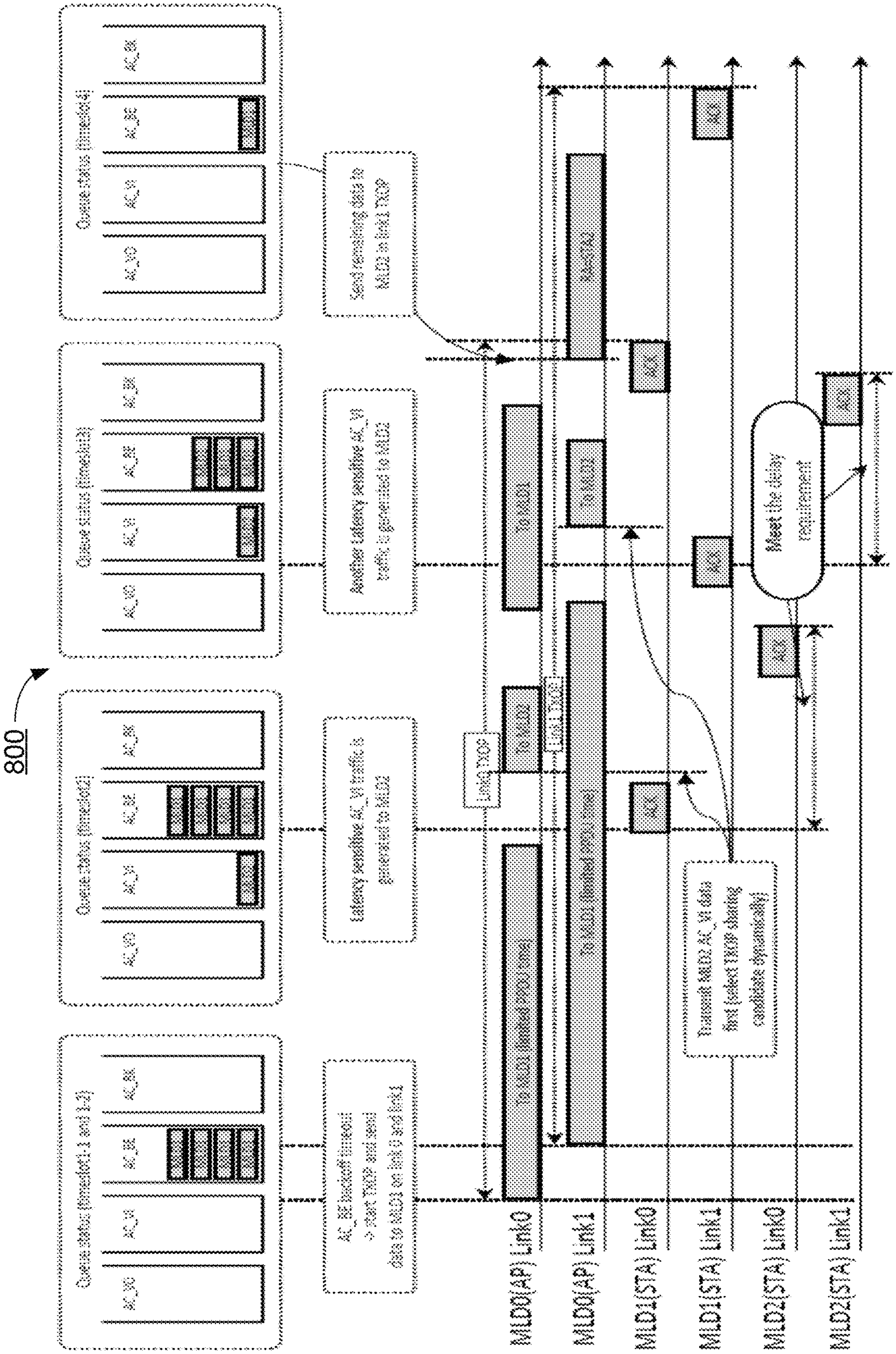
FIG. 8 is a diagram of an example scenario under a proposed scheme in accordance with the present disclosure.

FIG. 8 illustrates an example scenario 800 under a proposed scheme in accordance with the present disclosure. Specifically, scenario 800 pertains to dynamic TXOP candidate selection with respect to DL transmission, multi-link operation (MLO) and different Acs, as an example implementation of MLO with adaptive TXOP sharing. Referring to FIG. 8, there is only a queue of AC_BE data for AP for transmission in timeslots 1-1 and 1-2. Upon expiry of a backoff timer associated with AC_BE, an AP MLD (denoted as "MLD0(AP)" in FIG. 8) starts a TXOP and transmits data on Link0 and Link1 to a STA MLD (denoted as "MLD1 (STA)" in FIG. 8) with limited PPDU time. In timeslot 2, latency-sensitive AC_VI data is generated and destined for another STA MLD (denoted as "MDL2(STA)" in FIG. 8), and thus AP MLD transmits the AC_VI data on the next PPDU on Link0 to meet the delay requirement associated with the AC_VI data, even though the queue of the AC_BE data is not empty (e.g., the queue associated with the primary AC is not empty). In timeslot 3, latency-sensitive AC_VI data is also generated and destined for MDL2(STA), and thus AP MLD transmits the AC_VI data on the next PPDU on Link1 to meet the delay requirement associated with the AC_VI data, even though the queue of the AC_BE data is not empty (e.g., the queue associated with the primary AC is not empty). On the other hand, limited PPDU time on Link0 and Link1 may be different because physical layer (PHY) rates on Link0 and Link1 may not be equal.

In view of the above, under one or more proposed schemes among the various proposed schemes in accordance with the present disclosure, an adaptive TXOP sharing mechanism, a TXOP sharing candidate selection mechanism and a PPDU time limitation/adjustment mechanism may be utilized to improve medium utilization when reaching an extra-low latency requirement. Under the proposed schemes, an adaptive TXOP decision mechanism may distinguish whether adaptive TXOP sharing should be turned on (activated) or turned off (deactivated) based on the traffic characteristics (e.g., RA, five-tuple information, and some WFA QoS R3 characteristics). The adaptive TXOP sharing mechanism may include two parts, namely: TXOP sharing candidate selection and PPDU time limitation. The TXOP sharing candidate may be selected from latency-sensitive traffic first. The traffics of multiple STAs may be of the same AC, and the selection may be a dynamic mechanism for different traffic patterns. Moreover, latency-sensitive traffic may be transmitted in a TXOP first even if a primary AC is not empty. Furthermore, the PPDU time of a non-latency-sensitive traffic in the TXOP may be set for different latency-sensitive STA requirements and data rates.

Illustrative Implementations

Figure 9:
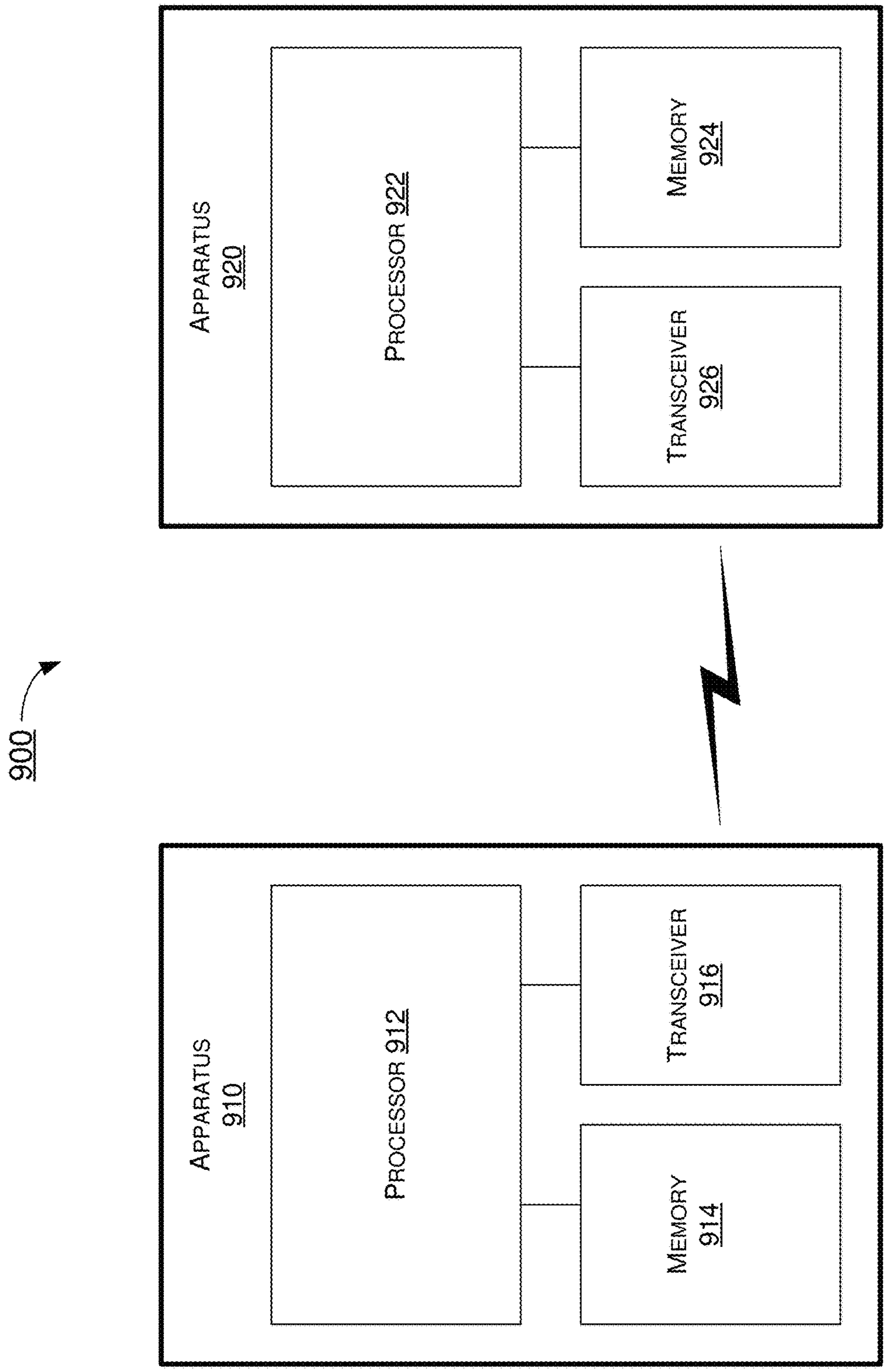
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to adaptive TXOP sharing for latency-sensitive traffic in wireless communications, including the various schemes described above with respect to various proposed designs, concepts, schemes, systems and methods described above as well as processes described below. For instance, apparatus 910 may be implemented in STA 110 and apparatus 920 may be implemented in STA 120, or vice versa.

Each of apparatus 910 and apparatus 920 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to adaptive TXOP sharing for latency-sensitive traffic in wireless communications in accordance with various implementations of the present disclosure.

In some implementations, apparatus 910 may also include a transceiver 916 coupled to processor 912. Transceiver 916 may include a transmitter capable of wirelessly transmitting and a receiver capable of wirelessly receiving data. In some implementations, apparatus 920 may also include a transceiver 926 coupled to processor 922. Transceiver 926 may include a transmitter capable of wirelessly transmitting and a receiver capable of wirelessly receiving data. It is noteworthy that, although transceiver 916 and transceiver 926 are illustrated as being external to and separate from processor 912 and processor 922, respectively, in some implementations, transceiver 916 may be an integral part of processor 912 as a system on chip (SoC) and/or transceiver 926 may be an integral part of processor 922 as a SoC.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (FeRAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as STA 110, and apparatus 920, as STA 120, is provided below. It is noteworthy that, although a detailed description of capabilities, functionalities and/or technical features of apparatus 920 is provided below, the same may be applied to apparatus 910 although a detailed description thereof is not provided solely in the interest of brevity. It is also noteworthy that, although the example implementations described below are provided in the context of WLAN, the same may be implemented in other types of networks.

Under various proposed schemes pertaining to adaptive TXOP sharing for latency-sensitive traffic in wireless communications in accordance with the present disclosure, with apparatus 910 implemented in or as STA 110 and apparatus 920 implemented in or as STA 120 in network environment 100, processor 912 of apparatus 910 may determine whether to activate an adaptive TXOP sharing mechanism with respect to a plurality of traffics having different latency requirements and pending transmission. Moreover, in response to determining to activate the adaptive TXOP sharing mechanism, processor 912 may utilize the adaptive TXOP sharing mechanism in transmitting (e.g., to apparatus 920) one or more traffics of the plurality of traffics associated with different STAs. For instance, processor 912 may select a candidate traffic from the one or more traffics of the plurality of traffics. Alternatively, or additionally, processor 912 may adjust a transmission time of the candidate traffic in transmitting the candidate traffic during a TXOP.

In some implementations, in determining, processor 912 may determine whether to activate the adaptive TXOP sharing mechanism based on characteristics of the plurality of traffics. In some implementations, the characteristics of the plurality of traffics may include a RA, five-tuple information, and a QoS characteristics element associated with each of the plurality of traffics.

In some implementations, in transmitting the one or more traffics, processor 912 may transmit, via transceiver 916, a latency-sensitive traffic associated with a high-priority AC in the TXOP, which is associated with a low-priority AC, even though a queue of data pending transmission and associated with the low-priority AC is not empty.

In some implementations, in selecting, processor 912 may select the candidate traffic from the one or more traffics of the plurality of traffics of a same AC or different ACs and with different delay requirements.

In some implementations, in selecting, processor 912 may perform certain operations. For instance, processor 912 may determine a respective priority associated with each STA of the plurality of STAs by calculating a respective remaining time budget of each STA. Additionally, processor 912 may select the candidate traffic which is associated with one of the plurality of STAs having a smallest remaining time budget compared to remaining time budgets of other STAs of the plurality of STAs. In such cases, in transmitting, processor 912 may transmit the candidate traffic after transmission of a non-latency-sensitive traffic in the TXOP.

In some implementations, in adjusting the transmission time, processor 912 may limit the transmission time of one or more PPDUs of the candidate traffic, which is a non-latency-sensitive traffic of the plurality of traffics, based on a latency requirement and a data rate of a latency-sensitive traffic of the plurality of traffics. In such cases, in limiting the transmission time of the one or more PPDUs of the non-latency-sensitive traffic, processor 912 may limit the transmission time of the one or more PPDUs of the non-latency-sensitive traffic to be less than or equal to a latency requirement of the latency-sensitive traffic minus a transmission time of one or more PPDUs of the latency-sensitive traffic.

Illustrative Processes

Figure 10:
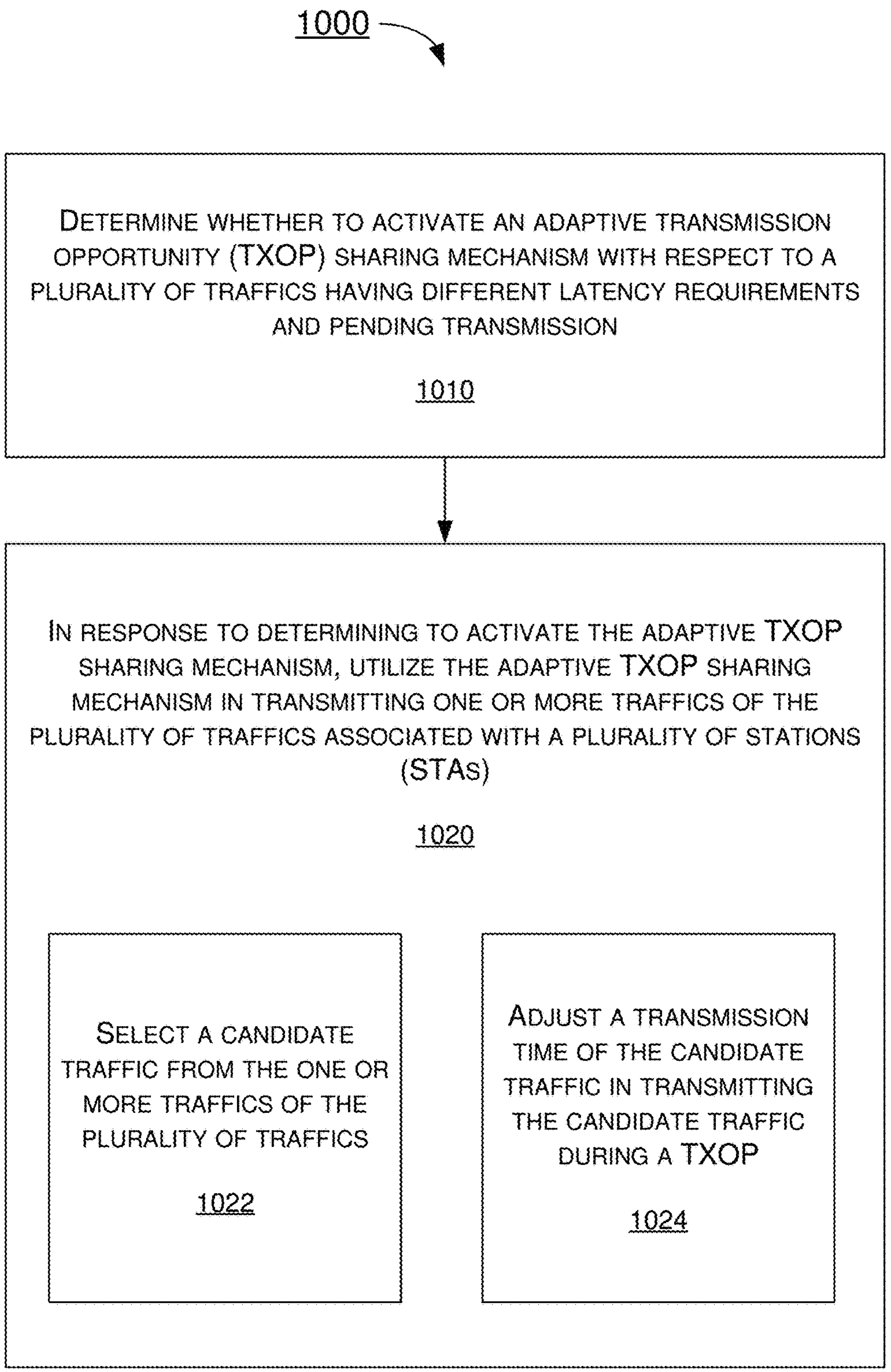
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to adaptive TXOP sharing for latency-sensitive traffic in wireless communications in accordance with the present disclosure. Process 1000 may include one or more operations, actions, or functions as illustrated by one or more of blocks 1010 and 1020 as well as subblocks 1022 and 1024. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 implemented in or as STA 110 functioning as a non-AP STA (or an AP STA) and apparatus 920 implemented in or as STA 120 functioning as an AP STA (or a non-AP STA) of a wireless network such as a WLAN in network environment 100 in accordance with one or more of IEEE 802.11 standards. Process 1000 may begin at block 1010.

At 1010, process 1000 may involve processor 912 of apparatus 910 determining whether to activate an adaptive TXOP sharing mechanism with respect to a plurality of traffics having different latency requirements and pending transmission. Process 1000 may proceed from 1010 to 1020.

At 1020, in response to determining to activate the adaptive TXOP sharing mechanism, process 1000 may involve processor 912 utilizing the adaptive TXOP sharing mechanism in transmitting (e.g., to apparatus 920) one or more traffics of the plurality of traffics associated with different STAs. The utilization of the adaptive TXOP sharing mechanism may be represented by 1022 and/or 1024.

At 1022, process 1000 may involve processor 912 selecting a candidate traffic from the one or more traffics of the plurality of traffics.

At 1024, process 1000 may involve processor 912 adjusting a transmission time of the candidate traffic in transmitting the candidate traffic during a TXOP.

In some implementations, in determining, process 1000 may involve processor 912 determining whether to activate the adaptive TXOP sharing mechanism based on characteristics of the plurality of traffics. In some implementations, the characteristics of the plurality of traffics may include a RA, five-tuple information, and a QoS characteristics element associated with each of the plurality of traffics.

In some implementations, in transmitting the one or more traffics, process 1000 may involve processor 912 transmitting, via transceiver 916, a latency-sensitive traffic associated with a high-priority AC in the TXOP, which is associated with a low-priority AC, even though a queue of data pending transmission and associated with the low-priority AC is not empty.

In some implementations, in selecting, process 1000 may involve processor 912 selecting the candidate traffic from the one or more traffics of the plurality of traffics of a same AC or different ACs and with different delay requirements.

In some implementations, in selecting, process 1000 may involve processor 912 performing certain operations. For instance, process 1000 may involve processor 912 determining a respective priority associated with each STA of the plurality of STAs by calculating a respective remaining time budget of each STA. Additionally, process 1000 may involve processor 912 selecting the candidate traffic which is associated with one of the plurality of STAs having a smallest remaining time budget compared to remaining time budgets of other STAs of the plurality of STAs. In such cases, in transmitting, process 1000 may involve processor 912 transmitting the candidate traffic after transmission of a non-latency-sensitive traffic in the TXOP.

In some implementations, in adjusting the transmission time, process 1000 may involve processor 912 limiting the transmission time of one or more PPDUs of the candidate traffic, which is a non-latency-sensitive traffic of the plurality of traffics, based on a latency requirement and a data rate of a latency-sensitive traffic of the plurality of traffics. In such cases, in limiting the transmission time of the one or more PPDUs of the non-latency-sensitive traffic, process 1000 may involve processor 912 limiting the transmission time of the one or more PPDUs of the non-latency-sensitive traffic to be less than or equal to a latency requirement of the latency-sensitive traffic minus a transmission time of one or more PPDUs of the latency-sensitive traffic.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining whether to activate an adaptive transmission opportunity (TXOP) sharing mechanism with respect to a plurality of traffics having different latency requirements and pending transmission; and responsive to determining to activate the adaptive TXOP sharing mechanism, utilizing the adaptive TXOP sharing mechanism in transmitting one or more traffics of the plurality of traffics associated with a plurality of stations (STAs) by performing either or both of:

selecting a candidate traffic from the one or more traffics of the plurality of traffics; and adjusting a transmission time of the candidate traffic in transmitting the candidate traffic during a TXOP, wherein the selecting comprises determining a respective priority associated with each STA of the plurality of STAs by calculating a respective remaining time budget of each STA.

2. The method of claim 1, wherein the determining comprises determining whether to activate the adaptive TXOP sharing mechanism based on characteristics of the plurality of traffics.

3. The method of claim 2, wherein the characteristics of the plurality of traffics comprise a receiver address (RA), five-tuple information, and a quality of service (QoS) characteristics element associated with each of the plurality of traffics.

4. The method of claim 1, wherein the transmitting of the one or more traffics comprises transmitting a latency-sensitive traffic associated with a high-priority access category (AC) in the TXOP, which is associated with a low-priority AC, even though a queue of data pending transmission and associated with the low-priority AC is not empty.

5. The method of claim 1, wherein the selecting comprises selecting the candidate traffic from the one or more traffics of the plurality of traffics of a same access category (AC) or different ACs and with different delay requirements.

6. The method of claim 1, wherein the selecting further comprises selecting the candidate traffic which is associated with one of the plurality of STAs having a smallest remaining time budget compared to remaining time budgets of other STAs of the plurality of STAs.

7. The method of claim 6, wherein the transmitting comprises transmitting the candidate traffic after transmission of a non-latency-sensitive traffic in the TXOP.

8. The method of claim 1, wherein the adjusting of the transmission time comprises limiting the transmission time of one or more physical-layer protocol data units (PPDUs) of the candidate traffic, which is a non-latency-sensitive traffic of the plurality of traffics, based on a latency requirement and a data rate of a latency-sensitive traffic of the plurality of traffics.

9. The method of claim 8, wherein the limiting of the transmission time of the one or more PPDUs of the non-latency-sensitive traffic comprises limiting the transmission time of the one or more PPDUs of the non-latency-sensitive traffic to be less than or equal to a latency requirement of the latency-sensitive traffic minus a transmission time of one or more PPDUs of the latency-sensitive traffic.

10. An apparatus, comprising:

a transceiver configured to communicate wirelessly; and a processor coupled to the transceiver and configured to perform operations comprising:

determining whether to activate an adaptive transmission opportunity (TXOP) sharing mechanism with respect to a plurality of traffics having different latency requirements and pending transmission; and responsive to determining to activate the adaptive TXOP sharing mechanism, utilizing the adaptive TXOP sharing mechanism in transmitting one or more traffics of the plurality of traffics associated with a plurality of stations (STAs) by performing either or both of:

selecting a candidate traffic from the one or more traffics of the plurality of traffics; and adjusting a transmission time of the candidate traffic in transmitting the candidate traffic during a TXOP, wherein the selecting comprises determining a respective priority associated with each STA of the plurality of STAs by calculating a respective remaining time budget of each STA.

11. The apparatus of claim 10, wherein the determining comprises determining whether to activate the adaptive TXOP sharing mechanism based on characteristics of the plurality of traffics.

12. The apparatus of claim 11, wherein the characteristics of the plurality of traffics comprise a receiver address (RA), five-tuple information, and a quality of service (QoS) characteristics element associated with each of the plurality of traffics.

13. The apparatus of claim 10, wherein the transmitting of the one or more traffics comprises transmitting a latency-sensitive traffic associated with a high-priority access category (AC) in the TXOP, which is associated with a low-priority AC, even though a queue of data pending transmission and associated with the low-priority AC is not empty.

14. The apparatus of claim 10, wherein the selecting comprises selecting the candidate traffic from the one or more traffics of the plurality of traffics of a same access category (AC) or different ACs and with different delay requirements.

15. The apparatus of claim 10, wherein the selecting further comprises selecting the candidate traffic which is associated with one of the plurality of STAs having a smallest remaining time budget compared to remaining time budgets of other STAs of the plurality of STAs.

16. The apparatus of claim 15, wherein the transmitting comprises transmitting the candidate traffic after transmission of a non-latency-sensitive traffic in the TXOP.

17. The apparatus of claim 10, wherein the adjusting of the transmission time comprises limiting the transmission time of one or more physical-layer protocol data units (PPDUs) of the candidate traffic, which is a non-latency-sensitive traffic of the plurality of traffics, based on a latency requirement and a data rate of a latency-sensitive traffic of the plurality of traffics.

18. The apparatus of claim 17, wherein the limiting of the transmission time of the one or more PPDUs of the non-latency-sensitive traffic comprises limiting the transmission time of the one or more PPDUs of the non-latency-sensitive traffic to be less than or equal to a latency requirement of the latency-sensitive traffic minus a transmission time of one or more PPDUs of the latency-sensitive traffic.

* * * * *